(12) United States Patent
Jung et al.

(10) Patent No.: US 9,288,090 B2
(45) Date of Patent: Mar. 15, 2016

(54) SPECTRUM SENSING METHOD AND SPECTRUM SENSING DEVICE

(71) Applicant: ELECTRONICS AND TELECOMMUNICATIONS RESEARCH INSTITUTE, Daejeon (KR)

(72) Inventors: Hoi Yoon Jung, Daejeon (KR); Jung Sun Um, Daejeon (KR); Byung Jang Jeong, Daejeon (KR); Jae Ick Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/599,640

(22) Filed: Jan. 19, 2015

(65) Prior Publication Data

US 2015/0229499 A1    Aug. 13, 2015

(30) Foreign Application Priority Data

Feb. 11, 2014  (KR) ........................ 10-2014-0015491

(51) Int. Cl.
*H04L 27/00*  (2006.01)
(52) U.S. Cl.
CPC .................................. *H04L 27/0006* (2013.01)
(58) Field of Classification Search
CPC .................................................. H04L 27/0006
USPC .......... 455/450, 452.1, 450.2, 464, 509, 63.1, 455/63.3
See application file for complete search history.

(56) References Cited

U.S. PATENT DOCUMENTS

| 2005/0123129 | A1* | 6/2005  | Awad     | H04M 9/082  |
|              |     |         |          | 379/406.01  |
| 2006/0268755 | A1* | 11/2006 | Pajukoski | H04L 1/0003 |
|              |     |         |          | 370/282     |
| 2014/0192993 | A1* | 7/2014  | Mikami   | H04R 3/02   |
|              |     |         |          | 381/71.4    |
| 2014/0323054 | A1* | 10/2014 | Aryanfar | H04B 7/005  |
|              |     |         |          | 455/63.3    |

FOREIGN PATENT DOCUMENTS

KR         20130065458 A      6/2013

OTHER PUBLICATIONS

Shane F. Cotter, et al; "Sparse Solutions to Linear Inverse Problems With Multiple Measurement Vectors", IEEE Transactions on Signal Processing, vol. 53, No. 7, Jul. 2005, pp. 2477-2488.
Moshe Mishali, et al; "From Theory to Practice: Sub-Nyquist Sampling of Sparse Wideband Analog Signals", IEEE Journal of Selected Topics in Signal Processing, vol. 4, No. 2, Apr. 2010, pp. 375-391.

* cited by examiner

*Primary Examiner* — Cong Tran
(74) *Attorney, Agent, or Firm* — Ladas & Parry LLP (57) ABSTRACT

The present disclosure relate to a spectrum sensing method and a spectrum sensing device. The spectrum sensing method includes: (a) sampling a received signal: (b) calculating a first operation value relating to a strength of the received signal based on the sampled signal; (c) searching for a first frequency band having the largest correlation with an input signal based on the sampled signal; (d) calculating a first residual component signal by removing a signal component in the first frequency band from the received signal; (e) calculating a second operation value relating to a strength of the first residual component signal; and (f) determining whether the frequency band occupied in the received signal is present based on a relative value of the first operation value and the second operation value.

15 Claims, 11 Drawing Sheets

SPECTRUM SENSING METHOD AND SPECTRUM SENSING DEVICE

CROSS-REFERENCE TO RELATED APPLICATIONS

This application claims priority to and the benefit of Korean Patent Application No. 10-2014-0015491 filed in the Korean Intellectual Property Office on Feb. 11, 2014, the entire contents of which are incorporated herein by reference.

TECHNICAL FIELD

The present disclosure relate to a spectrum sensing method and a spectrum sensing device.

BACKGROUND ART

To efficiently use limited frequency resources in a wireless communication field, there has been a growing interest in a frequency sharing technology to share and use frequency and a study on a cognitive radio system to achieve the frequency sharing technology has been actively conducted. The cognitive radio system considers a spectrum sensing technology to search for a channel which is not used by existing users or other systems.

Meanwhile, as a common frequency band is expanded, a band of spectrum performing the sensing is also expanded. Therefore, a study on wideband spectrum sensing to efficiently perform the spectrum sensing has been actively progressed.

SUMMARY OF THE INVENTION

The present disclosure has been made in an effort to provide a spectrum sensing method and a spectrum sensing device capable of improving sensing performance in actual environment by improving signal detection performance and reducing false alarm probability in a spectrum sensing technology.

An exemplary embodiment of the present disclosure provides a spectrum sensing method including: (a) sampling a received signal: (b) calculating a first operation value relating to a strength of the received signal based on the sampled signal; (c) searching for a first frequency band having the largest correlation with an input signal based on the sampled signal; (d) calculating a first residual component signal by removing a signal component in the first frequency band from the received signal; (e) calculating a second operation value relating to a strength of the first residual component signal; and (f) determining whether the frequency band occupied in the received signal is present based on a relative value of the first operation value and the second operation value.

In the step (f), when a ratio of the first operation value to the second operation value exceeds a reference value, it may be determined that the frequency band occupied in the first residual component signal remains.

The spectrum sensing method may further include: searching for a second frequency band having the largest correlation in the first residual component signal; calculating a second residual component signal by removing a signal component in the second frequency band from the first residual component signal; and calculating a third operation value relating to a strength of the second residual component signal, in which in the step (f), it may be determined whether the frequency band occupied in the sampled signal remains by comparing a first difference value which is a difference between the first operation value and the second operation value with a second difference value which is a difference between the second operation value and the third operation value.

The step (f) may include: calculating the difference between the first operation value and the second operation value; normalizing the difference value; and when the normalized value is equal to or more than the reference value, determining whether the frequency band occupied in the first residual component signal remains.

If it is determined in the step (f) that the occupied frequency band remains, the steps (b) to (f) may be repeatedly performed using the first residual component signal calculated in the step (d) as an input, instead of the signal sampled in the step (b).

The sampling may use a compressive spectrum sensing method.

The first operation value and the second operation value may be a F-norm value of a matrix representing a signal.

Another exemplary embodiment of the present disclosure provides a spectrum sampling device including: a sampling unit configured to sample a received signal; a first operation unit configured to calculate an operation value relating to a strength of an input signal; a frequency searching unit configured to search for a frequency band having the largest correlation with the input signal; a second operation unit configured to generate a residual component signal by removing a signal component in a specific frequency band from the input signal; and a determination unit configured to determine whether the occupied frequency band is present, in which the first operation unit may receive the signal sampled by the sampling unit and the residual component signal generated from the second operation unit, respectively, as the input signal to calculate a first operation value and a second operation value which are operation values for each signal, the frequency searching unit may receive the signal sampled by the sampling unit or the residual component signal generated from the second operation unit as the input signal to search for the frequency band having the largest correlation for the received signal, and the determination unit may determine whether the frequency band occupied in the received signal is present based on a relative value of the first operation value and the second operation value.

The determination unit may determine that the frequency band occupied in the first residual component signal remains when a ratio of the second operation value to the first operation value is equal to or more than a reference value.

The frequency searching unit may search for a first frequency band from the sampled signal and search for a second frequency band from the residual component signal generated from the second operation unit, the second operation unit may calculate a first residual component signal by removing a signal component in the first frequency band from the sampled signal and calculate a second residual component signal by removing a signal component in the second frequency band from the first residual component signal, and the first operation unit may additionally calculate a third operation value from the second residual component signal, and the determination unit may determine whether the frequency band occupied in the sampled signal remains by comparing a first difference value which is a difference between the first operation value and the second operation value with a second difference value which is a difference between the second operation value and the third operation value.

The determination unit may calculate a difference between the first operation value and the second operation value and normalize the calculated difference value to determine whether the frequency band occupied in a signal currently input to the second operation unit remains when the normalized value is equal to or more than the reference value.

When the determination unit determines that the frequency band occupied in the signal currently input to the second operation unit remains, operations of each of the frequency searching unit, the first operation unit, and the determination unit may be repeated based on the residual component signal generated from the second calculation unit.

The sampling unit may use a compressive spectrum sensing method.

The first operation value and the second operation value may be an F-norm value of a matrix representing a signal.

Yet another exemplary embodiment of the present disclosure provides a compressive spectrum sensing method including: detecting a first signal component derived from an input signal and a second signal component obtained by removing the strongest signal component in a frequency band in the first signal component from the first signal component; calculating a first operation value and a second operation value relating to sizes of each of the first signal component and the second signal component; and determining whether the frequency band occupied in the input signal is present based on a relative value of the first operation value and the second operation value.

As described above, according to the exemplary embodiments of the present disclosure, it is possible to provide the spectrum sensing method and the spectrum sensing device capable of improving the sensing performance in the actual environment by improving the signal detection performance and reducing the false alarm probability.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Since the present disclosure may be variously modified and have several exemplary embodiments, specific exemplary embodiments will be illustrated in the accompanying drawings and be described in detail in a detailed description. However, it is to be understood that the present disclosure is not limited to the specific exemplary embodiments, but includes all modifications, equivalents, and substitutions included in the spirit and the scope of the present disclosure. Further, if it is determined that the detailed description of the known art relating to the present disclosure may obscure the gist of the present disclosure, the detailed description thereof will be omitted.

Hereinafter, exemplary embodiments of the present disclosure will be described in detail with reference to the accompanying drawings.

Figure 1:
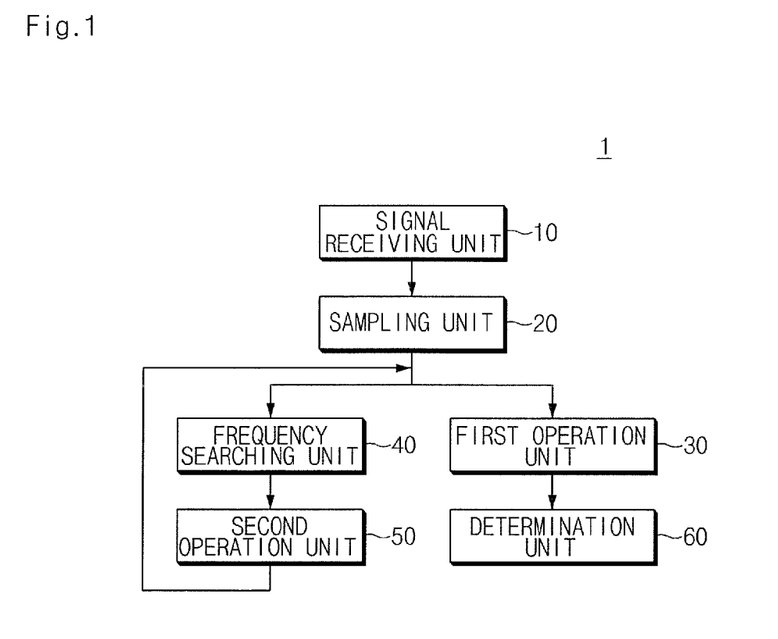
FIG. 1 is a block diagram illustrating a configuration of a spectrum sensing device according to an exemplary embodiment of the present disclosure.

FIG. 1 is a block diagram illustrating a configuration of a spectrum sensing device 1 according to an exemplary embodiment of the present disclosure.

Referring to FIG. 1, the spectrum sensing device 1 is a device which senses signals transmitted from the outside to determine whether there is a frequency band which is occupied by other users or systems in a communication channel. The spectrum sensing device 1 may include a signal receiving unit 10, a sampling unit 20, a first operation unit 30, a frequency retrieving unit 40, a second operation unit 50, and a determination unit 60.

The signal receiving unit 10 receives a wireless signal transmitted from the outside using an antenna, and the like.

The sampling unit 20 performs a sampling operation on the received signal to perform compression spectrum sensing processing on a portion recovered into an original digital data. Hereinafter, the sampling unit 20 will be described in detail with reference to FIG. 2.

A technology called compressive sensing for performing efficient signal processing on a wideband signal has recently drawn much attention. An existing Nyquist sampling theory is a theory which needs to make a sampling frequency be twice larger than a highest frequency of an original signal so as to perfectly recover the original signal in a conversion process of an analog signal into a digital signal. The compressive sensing technology is a theory which overcomes the existing concept to be able to recover the original signal even at the sampling frequency lower than that.

The compressive sensing theory is based on sparsity. The sparsity means that when any signal is observed in any domain, a majority of signal components have 0 and only a minority of components have components other than 0. Here, the signal is called a sparse signal. For example, most components of a continuous sinusoidal wave signal on a time base have a value other than 0, but when the continuous sinusoidal wave signal is observed on a frequency base, most components of the continuous sinusoidal wave signal have a value other than 0 only in a specific frequency and the most remaining frequency components become 0. The compressive sensing theory is a core theory to be able to recover the original signal without a loss only by a little linear measurement for the sparse signal.

The application and utilization of the spectrum sensing technology based on the compressive sensing theory were predominantly performed by a research team of professor Eldar of Technion-Israel Institute of Technology. The research team applies the compressive sensing technology to the spectrum sensing technology using a modulated wideband converter (MWC) structure.

Figure 2:
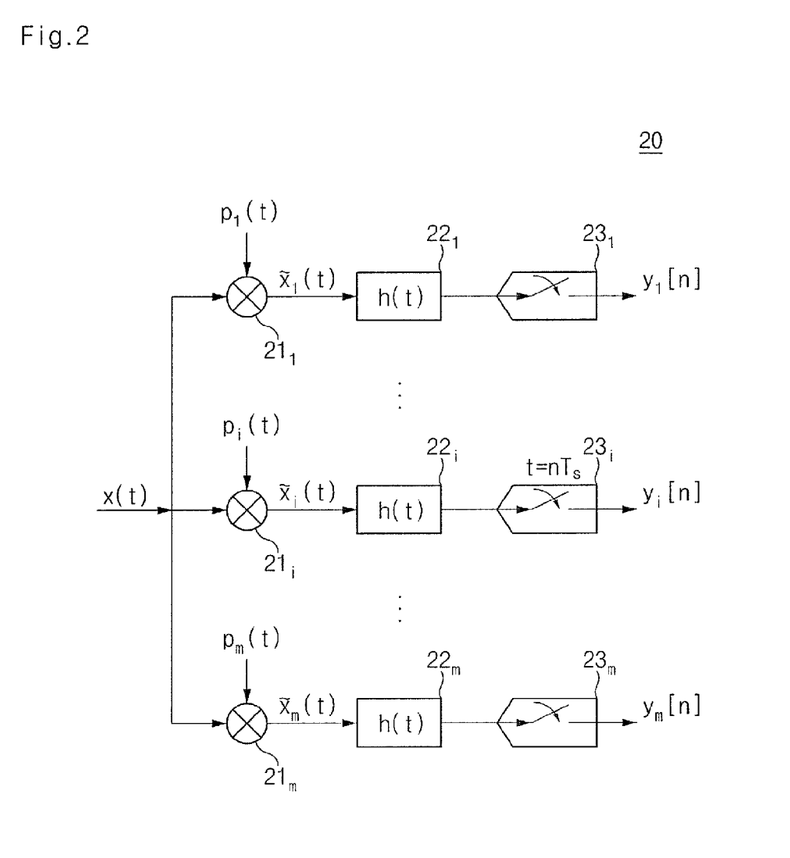
FIG. 2 is a diagram illustrating a configuration of a sampling unit.

FIG. 2 is a diagram illustrating a configuration of the sampling unit 20, in which the wideband signal is sampled using the MWC structure.

After sequences $p_i$ (t) (i=1, 2, . . . m) having a period of $T_p$ is multiplied by an input signal x(t), low-pass filtering $h_i$ (t) is performed on an output signal $\tilde{x}_i(t)$. When the sampling is performed on the low-pass filtered signal but the operation is performed in a parallel structure, the sampling of the signal using the MWC structure is performed. Here, reference numerals $21_1$ to $21_m$ represent a multiplier, reference numerals $22_1$ to $22_m$ represent a low pass filter, and reference numerals $23_1$ to $23_m$ represent a sampling circuit having a period of nTs.

An output y [n] of the sampling has a sampling frequency much lower than a frequency of the input signal x (t) and for the wideband spectrum sensing using the compressive sensing, a frequency band in which the signal is present in the wideband input signal x (t) needs to be found using the compression-sampled signal y [n].

A conventional method to search for a channel occupied by the signal in the input signal x (t) using the compression-sampled signal y [n] is as follows.

First, a Q matrix satisfying the following Equation 1 for the compression-sampled signal y [n] is obtained. In the following Equation 1, $(\ )^H$ is a Hermitian operation.

$$Q = \int_{f \in F} y(f)y(f)^H \, df = \sum_{n=-\infty}^{\infty} y[n]y^H[n] \quad \text{[Equation 1]}$$

For the Q matrix obtained based on the above Equation 1, a V matrix which may be decomposed in a form of $Q=VV^H$ is found. As the sampling result, the Q matrix is obtained using the given y [n] and the V matrix may be obtained from the Q matrix using a linear logarithm well-known in the related art.

When the most sparse U matrix satisfying the following Equation 2 for the V matrix obtained by the above process and an A matrix which may be obtained based on a p (t) sequence used in the sampling process is found, a frequency location at which a signal is present in the input signal may be found.

$$V=AU \quad \text{[Equation 2]}$$

Figure 3:
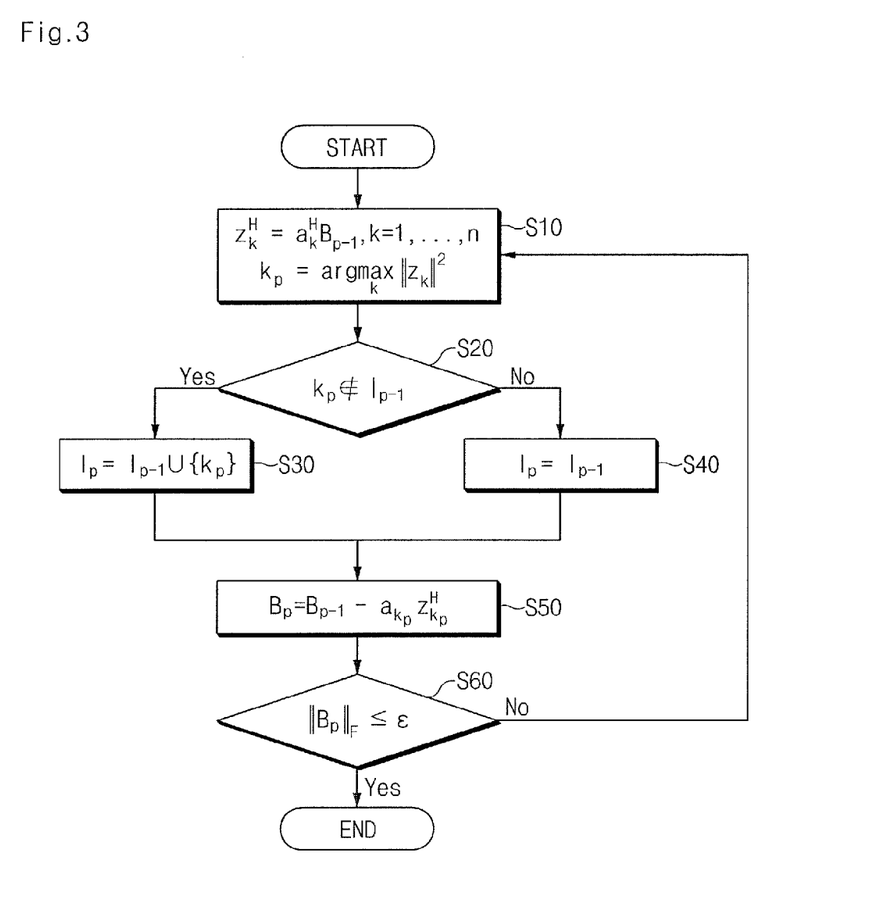
FIG. 3 is a flow chart illustrating a spectrum sensing method according to the related art.

FIG. 3 is a flow chart illustrating a spectrum sensing method according to the related art. Referring to FIG. 3, a method of obtaining a solution of the above Equation 2 will be described in more detail.

In FIG. 3, $a_k$ represents a k-th column of the A matrix. The overall flow of the flow chart of FIG. 3 is generally used to solve the above Equation 2, in which a frequency band having the largest correlation with the input signal for the sampled signal is found based on an operation like step S10 (S10). Further, it is determined whether the searched frequency band is the existing searched frequencies (S20) and if it is determined that the searched frequency band is a new frequency, a set of the existing searched frequencies includes a newly searched frequency (S30), or otherwise the set of the frequencies is maintained as it is (S40). Further, the signal component in the searched frequency band is removed from the sampled signal or the signal used in the previous step to generate residual component signals (S50) and F-norm is obtained based on the residual component signals to determine whether the obtained F-norm value is equal to or less than a reference value (S60). When the F-norm value is larger than the reference value, it is determined that the frequency band still occupied in a transmission channel is present to make the process return to step S10, thereby repeating steps S10 to S60. On the other hand, when the F-norm value is equal to or less than the reference value, it is determined that the occupied channel is present no longer to end a signal searching operation.

FIG. 3 is an example of the spectrum sensing method, in which operations performed in a flow chart and parameters used therein may be changed depending on an algorithm. That is, FIG. 3 is an example of a method using a matching pursuit scheme, in which a calculation of $k_p$, a calculation of $B_p$, and the like may be changed depending on an algorithm.

Meanwhile, according to the existing spectrum sensing method, as in step S60, it is determined whether the occupied channel is present by determining whether the F-norm value of the residual matrix is equal to or less than the reference value. However, if it is determined whether the occupied channel is present based on the above method, detection error probability may be increased in the actual environment due to the effect of a strength of the received signal and a level of the received noise.

Figure 4A:
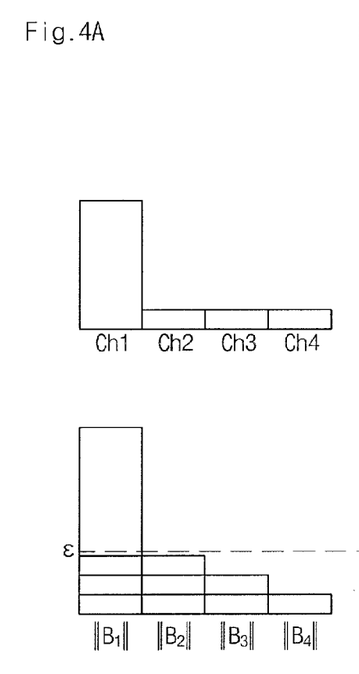
FIGS. 4A and 4B are conceptual diagrams describing cases in which signal detection is performed based on the spectrum sensing method of FIG. 3.
Figure 4B:
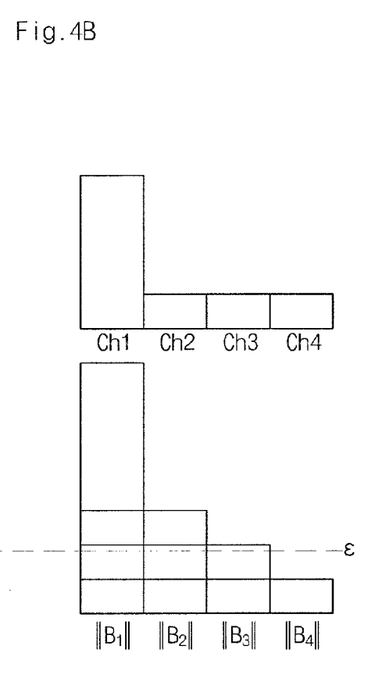

FIGS. 4A and 4B are conceptual diagrams describing cases in which signal detection is performed based on the spectrum sensing method of FIG. 3.

Referring to FIGS. 4A and 4B, a total of four channels are present and it is assumed that a signal is present only in a first channel ch1 among the four channels. In this case, when a noise dispersion is small, as illustrated in an upper end of FIG. 4A, a signal having a large strength is included in the first channel ch1 and only noise is present in second to fourth channels ch2 to ch4.

A F-norm value of a sparse matrix $B_1$ including all the signals is referred to as $\|B_1\|_F$, a F-norm value of a residual matrix $B_2$ from which a component of the first channel ch1 is removed is referred to as $\|B_2\|_F$, a F-norm value of a residual matrix $B_3$ in which a signal in a frequency band having a strongest correlation value is again removed from the $B_2$ is referred to as $\|B_3\|_F$, and a F-norm value of a final residual matrix $B_4$ is referred to as $\|B_4\|_F$. Further, only the $\|B_1\|_F$ has a value larger than $\epsilon$ which is the reference value, and therefore it is determined that the signal is present only in one of the total of four channels.

On the other hand, when the noise dispersion is large, as illustrated in an upper end of FIG. 4B, the signal is present only in the first channel ch1 and noise larger than the case of FIG. 4A is present in the second to fourth channels Ch2 to Ch4.

In this case, when the E which is the same as the reference value in FIG. 4A is set to be the reference value, as illustrated in a lower end of FIG. 4B, $\|B_2\|_F$ and $\|B_3\|_F$ as well as $\|B_1\|_F$ have a value larger than the reference value and therefore it is wrongly determined that the signals are present in three of the total of four channels.

That is, when the spectrum sensing is performed by the method illustrated in FIG. 3, the false alarm probability is increased and thus it is determined that the signal is present in the non-occupied channel, such that frequency resource utilization is reduced.

To the contrary, when the reference value E is largely set to match the environment of FIG. 4B, as illustrated in FIG. 4A, the signal detection probability may be rather reduced in the environment in which the noise dispersion is small.

Therefore, the first operation unit 30, the frequency searching unit 40, the second operation unit 50, and the determination unit 60 of the spectrum sensing device 1 according to the exemplary embodiment of the present disclosure are provided to increase the signal detection probability.

The first operation unit 30 calculates an operation value relating to the strength of the signal from the sparse matrix calculated based on the sampling signal received from the sampling unit 20. Further, the first operation unit 30 calculates an operation value relating to the strength of the signal from a residual component signal generated from the second operation unit 50 to be described below. Here, the sparse matrix calculated based on the sampling signal may be $B_1$ and an operation value as a value relating to the strength of the signal calculated therefrom may be $\|B_1\|_F$. Further, the residual component signal generated from the second operation unit 50 may be $B_2$ and an operation value as a value relating to the strength of the signal calculated therefrom may be $\|B_2\|_F$. Further, when the occupied signal further remains, $B_3$ and $B_4$ are also calculated and output by the second operation unit 50 and thus $\|B_3\|$, and $\|B_1\|_F$ may also be calculated.

The frequency searching unit 40 searches for the frequency band having the largest correlation value with the input signal in the sampled signal $B_1$. Further, when receiving the residual component signal from the second operation unit 50, the frequency searching unit 40 searches for the frequency band having the largest correlation value with the input signal from the received residual component signal. The searching of the frequency band may be performed by the method like step S10 illustrated in FIG. 3 or FIG. 6 to be described below. However, this is only an example and therefore is not limited thereto, and various methods known in the related art as the method for searching for a frequency band having a largest signal may be used and the parameters, and the like may be changed depending on the used method.

The second operation unit 50 removes the signal component of the frequency band having the largest correlation value with the input signal searched by the frequency searching unit 40 from the sampled signal $B_1$ to generate the residual component signal. Further, when the input signal is not the sampled signal $B_1$ but is the residual component signal generated from the second operation unit 50, a signal component of a newly searched frequency band is removed from the input residual component signal to generate a new residual component signal. That is, if the determination unit 60 determines that the occupied frequency band is present, the new residual component signal is generated based on the previously generated residual component signal. A method for generating a residual component signal may be performed by the method like step S50 illustrated in FIG. 3 or FIG. 6 to be described below. However, this is only an example and therefore is not limited thereto, and various methods known in the related art as the method for calculating a residual component signal may be used and the parameters, and the like may be changed depending on the used method.

The determination unit 60 determines whether the frequency band occupied in the sampled signal or the residual component signal is present based on a relative value of a plurality of operation values which are calculated by the first operation unit 30. Hereinafter, various determination methods of the determination unit 60 will be described in detail.

Figure 5A:
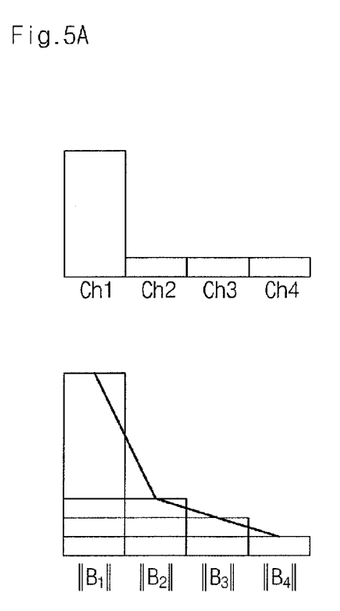
FIGS. 5A and 5B are conceptual diagrams describing cases in which signal detection is performed based on a spectrum sensing method according to an exemplary embodiment of the present disclosure.
Figure 5B:
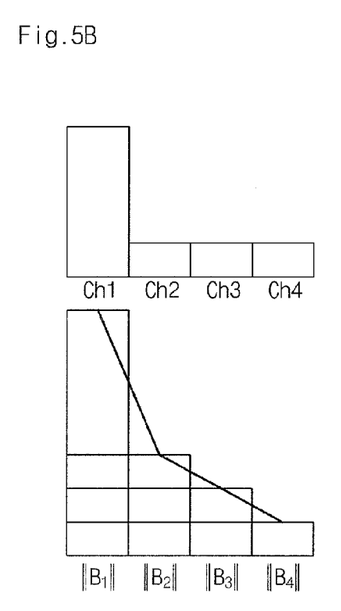
Figure 6:
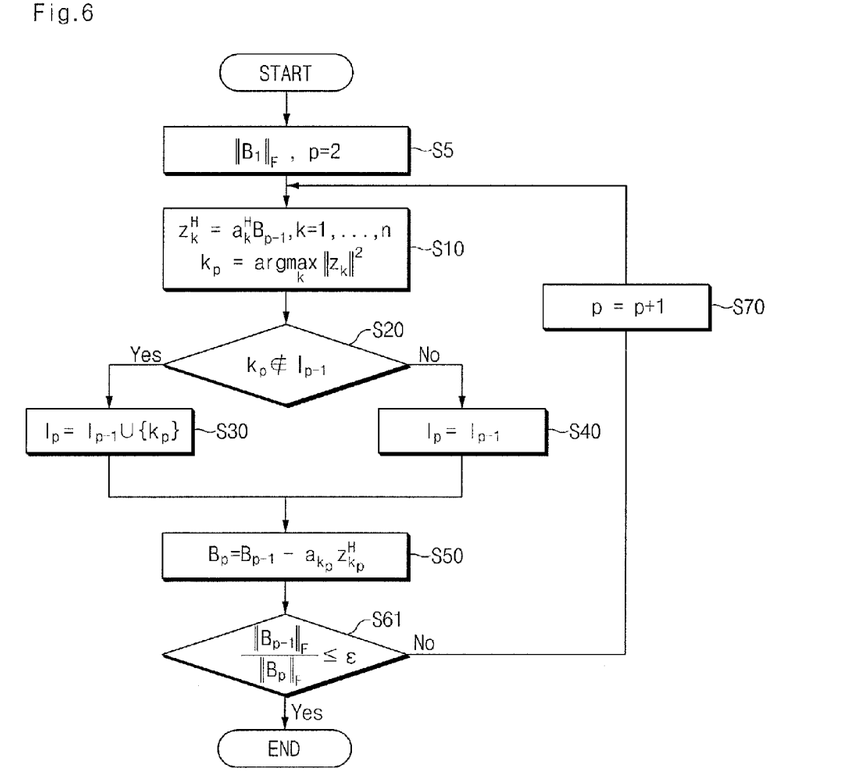
FIG. 6 is a flow chart illustrating the spectrum sensing method of FIGS. 5A and 5B.

FIGS. 5A and 5B are conceptual diagrams describing cases in which signal detection is performed based on a spectrum sensing method according to an exemplary embodiment of the present disclosure and FIG. 6 is a flow chart illustrating the spectrum sensing method of FIGS. 5A and 5B. As illustrated in FIGS. 4A and 4B, the case in which the signal is present only in the first channel ch1 is assumed.

Referring to FIGS. 5A and 5B, a reduction ratio of the F-norm value from the case of including the signal to the case of only including noise of the $B_p$ matrix is large, but the reduction ratio of the F-norm value between the $B_p$ matrixes only including the noise is constant to some extent. Further, the nature is similar in the case in which the noise dispersion is small as illustrated in FIG. 5A or in the case in which the noise dispersion is large as illustrated in FIG. 5B.

Therefore, according to the exemplary embodiment of the present disclosure, the determination unit 60 determines whether the frequency band occupied in the signal is present based on a saturation nature of the F-norm reduction ratio of the $B_p$ matrix as described above. That is, since the F-norm value of the $B_p$ matrix is monotonously reduced, when only the noise component is present in the $B_p$ matrix, it is determined whether the occupied frequency band is present based on a characteristic in which the reduction ratio is reduced to a predetermined level or less.

Referring to FIG. 6, first, the basic sparse matrix $B_1$ is calculated from the sampled signal based on the above Equation 2 (S5). Here, an initial value of p is set to be 2.

Next, the operations of steps S20 to S50 such as the searching of the frequency and the generation of the residual component signal as illustrated in FIG. 3 are performed.

Next, when the residual component signal $B_2$ is generated by the second operation unit 50, the first operation unit 30 calculates the operation value $\|B_2\|_F$ relating to the strength of the signal.

The determination unit 60 calculates a ratio of $\|B_1\|_F$ which is the operation value relating to the sampled signal to $\|B_2\|_F$ which is the operation value relating to the residual component signal to determine whether the calculated value is equal to or less than the reference value (S61).

The determination unit 60 determines that when the calculated value is larger than the reference value, a reduction width of the signal is large and therefore the occupied signal is still present and thus the process proceeds to step S70, thereby increasing the p value by 1 and repeating steps S20 to S60.

On the other hand, the determination unit 60 determines that when the calculated value is equal to or less than the reference value, the reduction width of the signal is not large to end the signal detection.

As such, the size of any one of the residual component signals does not compare with the reference value, but it is determined whether the occupied frequency band is present based on the relative value between the sizes of the plurality of residual component signals, thereby improving the signal detection performance independent of the size of the noise dispersion.

Figure 7A:
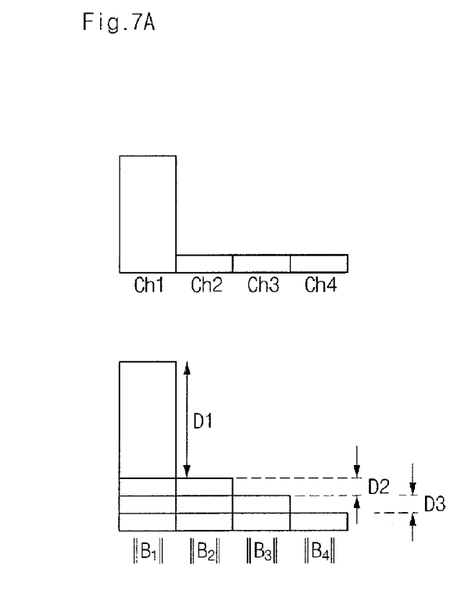
FIGS. 7A and 7B are conceptual diagrams describing cases in which signal detection is performed based on a spectrum sensing method according to another exemplary embodiment of the present disclosure.
Figure 7B:
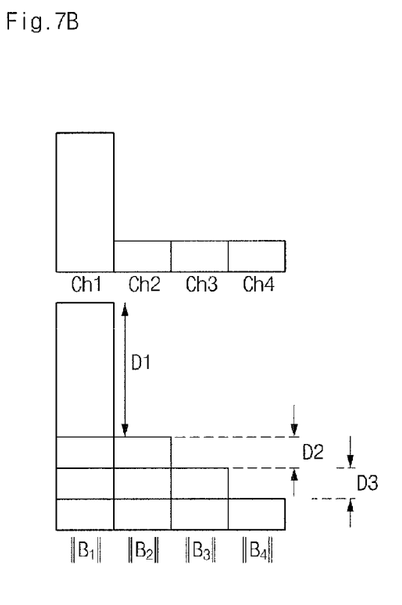
Figure 8:
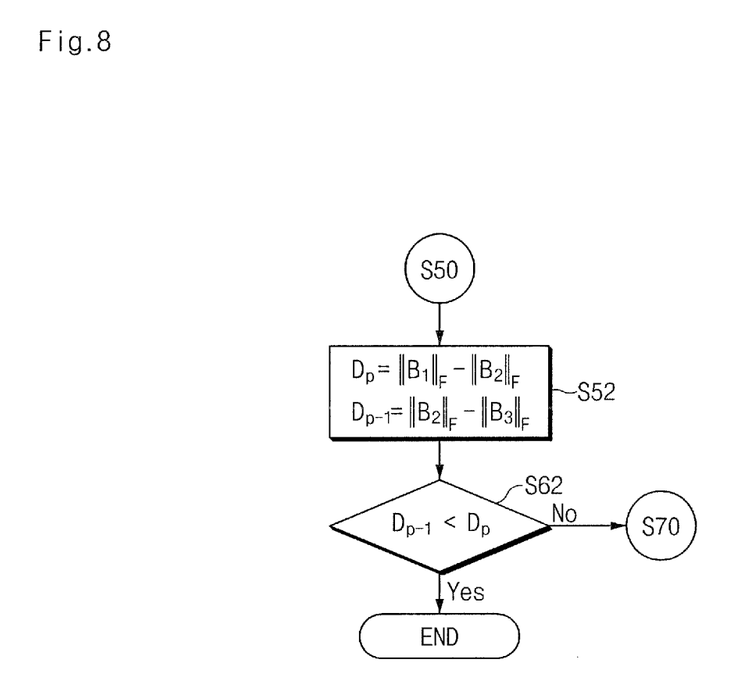
FIG. 8 is a flow chart illustrating the spectrum sensing method of FIG. 6.

FIGS. 7A and 7B are conceptual diagrams describing cases in which signal detection is performed based on a spectrum sensing method according to another exemplary embodiment of the present disclosure and FIG. 8 is a flow chart illustrating the spectrum sensing method of FIG. 6. According to the exemplary embodiment of the present disclosure, as illustrated in FIGS. 4A and 4B, the case in which the signal is present only in the first channel ch1 is assumed.

Referring to FIGS. 7A and 7B, according to the exemplary embodiment of the present disclosure, it is determined whether the occupied frequency band is present based on a difference between the F-norms of the $B_p$ matrixes.

For example, a difference between $\|B_1\|_F$ and $\|B_2\|_F$ is defined as D1 and a difference between $\|B_2\|_F$ and $\|B_2\|_F$ is defined as D2. In characteristics of the $B_p$ matrix, as the p value which is an index is increased, the F-norm value is monotonously reduced.

In this case, the signal component of the frequency band having the largest correlation value is removed from the residual component signal and therefore a component having the biggest influence among the components of the $B_p$ matrix is first removed. Therefore, when the signal component is present in the $B_p$ matrix, the reduction width of the F-norm value is large and the reduction width thereof is reduced with the increase in the p value. Further, when only the noise component is present, the reduction width is saturated at a constant value. Further, the nature is similar in the case in which the noise dispersion is small as illustrated in FIG. 7A or in the case in which the noise dispersion is large as illustrated in FIG. 7B.

Therefore, according to the exemplary embodiment of the present disclosure, the determination unit 60 determines whether the frequency band occupied in the signal is present based on the saturation nature of the F-norm reduction size of the $B_p$ matrix as described above. That is, since the F-norm value of the $B_p$ matrix is monotonously reduced, when only the noise component is present in the $B_p$ matrix, it is determined whether the occupied frequency band is present based on a characteristic in which the reduction size is reduced to a predetermined level or less.

Referring to FIG. 8, similar to FIG. 6, steps S5 to S50 are performed. Further, according to the exemplary embodiment of the present disclosure, the operation is performed until p=3 and thus the second operation unit 50 generates $B_1$, $B_2$, and $B_3$ and the first operation unit 30 calculates $\|B_1\|_F$, $\|B_2\|_F$, and $\|B_3\|_F$, respectively, based on the residual signal component.

Next, the determination unit 60 calculates D1 and D2 based on $\|B_1\|_F$, $\|B_2\|_F$, and $\|B_3\|_F$ calculated by the first operation unit 30 (S52) and determines whether the calculated D1 and D2 satisfy a condition of 'D1>D2' in step S62 (S62).

If the determination unit 60 determines that D1 and D2 satisfy the condition, the process proceeds to step S70 to repeat steps S20 to S62. On the other hand, if the determination unit 60 determines that D1 and D2 do not satisfy the condition, the determination unit 60 determines that there is no occupied frequency band, and the signal detection is ended.

That is, referring to FIGS. 7A and 7B, when the signal is present, a difference value of a relatively large F-norm value like D1 is generated and when no signal component is present and only the noise component is present, a difference value of a relatively small F-norm value like D2 or D3 is generated. Therefore, a condition of S62 is satisfied in the environment in which the signal is present in the residual $B_p$ matrix but the condition of S62 is not satisfied in the environment in which the signal is not present in the residual $B_p$ matrix.

As such, the size of any one of the residual component signals does not compare with the reference value, but it is determined whether the occupied frequency band is present based on the relative value between the sizes of the plurality of residual component signals, thereby improving the signal detection performance independent of the size of the noise dispersion.

Figure 9:
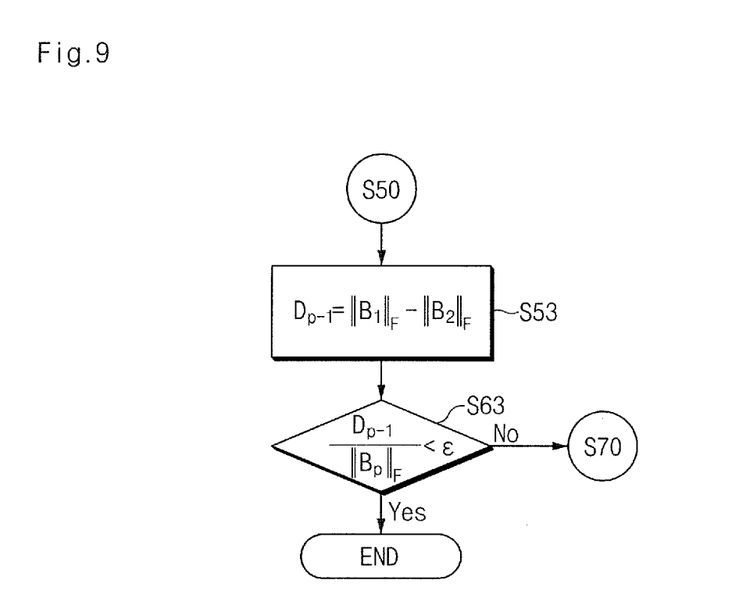
FIG. 9 is a flow chart illustrating the spectrum sensing method according to another exemplary embodiment of the present disclosure.

FIG. 9 is a flow chart illustrating the spectrum sensing method according to a third exemplary embodiment of the present disclosure.

Referring to FIG. 9, according to the exemplary embodiment of the present disclosure, it is determined whether the occupied frequency band is present by performing normalization on the difference value of the F-norm value of the $B_p$ matrix.

That is, as in step S53 of FIG. 9, a difference value between F-norm values of a $B_{p-1}$ matrix and the $B_p$ matrix is calculated and a difference value calculated in as step S63 is divided by the F-norm value of the $B_p$ matrix to perform the normalization. The determination unit 60 determines whether the value normalized in step S63 is smaller than the reference value to additionally detect the occupied frequency band by making the process return to step S70 if it is determined that the normalized value is equal to or more than the reference value or otherwise end the signal detection.

As such, the size of any one of the residual component signals does not compare with the reference value, but it is determined whether the occupied frequency band is present based on the relative value between the sizes of the plurality of residual component signals, thereby improving the signal detection performance independent of the size of the noise dispersion.

However, the normalization method is not limited to the method illustrated in FIG. 9 and therefore various normalization methods may be applied. For example, instead of $D_{p-1}/\|B_p\|_F < \epsilon$ of step S63, the normalization may be performed using Equation of $D_p/\|B_p\|_F < \epsilon$ or $D_{p-1}/(\|B_{p-1}\|_F+\|B_p\|_F) < \epsilon$.

Next, effects of the exemplary embodiments of the present disclosure will be described with reference to a simulation result.

Figure 10:
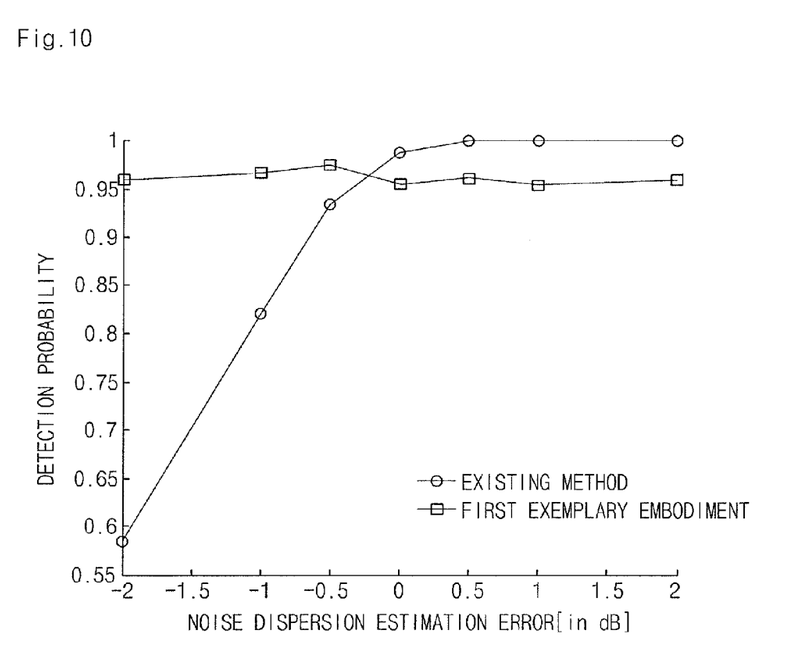
FIG. 10 is a graph illustrating signal detection probability when the spectrum sensing method of FIG. 6 is used.

FIG. 10 is a graph illustrating signal detection probability when the spectrum sensing method of FIG. 6 is used.

Referring to FIG. 10, a horizontal axis represents a noise dispersion estimation error and a vertical axis represents detection probability. In the experiment of FIG. 10, signals having sizes of 20 dB and 10 dB, respectively are generated in any two channels of a total of thirty eight 6 MHz channels. As the signal detection method, the method according to the first exemplary embodiment of the present disclosure illustrated in FIG. 6 is used. The noise dispersion estimation error illustrated on the horizontal axis is measured by the system or an actual noise dispersion error for a previously set noise dispersion value is represented.

When the detection probability is calculated by detecting the signal with the foregoing conditions, the existing method may confirm that when the actual noise dispersion is smaller than the noise dispersion measured or previously determined by the system, the signal detection probability is remarkably reduced. In particular, when an error of about 2 dB is present, it may be confirmed that the signal detection probability is reduced to about a half.

On the other hand, according to the first exemplary embodiment of the present disclosure, it may be confirmed that the signal detection performance is constantly maintained independent of the size of the noise dispersion estimation error.

Figure 11:
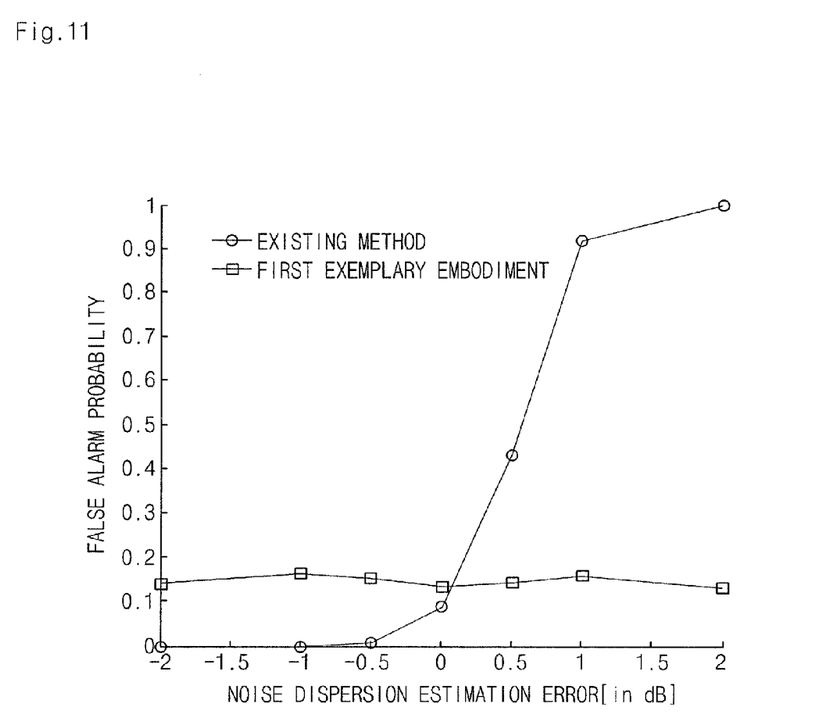
FIG. 11 is a graph illustrating false alarm occurrence probability when the spectrum sensing method of FIG. 6 is used.

FIG. 11 is a graph illustrating false alarm occurrence probability when the spectrum sensing method of FIG. 6 is used.

Referring to FIG. 11, a horizontal axis represents the noise dispersion estimation error and a vertical axis represents false alarm occurrence probability. Other experimental conditions are the same as FIG. 10.

When the false alarm probability which is the determination probability that the signal is present in the environment in which the signal is not present based on the foregoing conditions is calculated, the existing method may confirm that when the actual noise dispersion is larger than the noise dispersion measured or previously determined by the system, the false alarm probability is considerably increased. In particular, when an error of about 1 dB is present, the false alarm probability is increased up to about 90% and therefore it may be confirmed that it is difficult for the existing method to apply in the actual environment.

On the other hand, according to the first exemplary embodiment of the present disclosure, it may be confirmed that the false alarm probability is maintained at a very low constant level independent of the size of the noise dispersion estimation error.

As described above, according to the spectrum sensing method using the spectrum sensing device 1 according to the exemplary embodiment of the present disclosure, the sensing performance in the actual environment may be improved by improving the signal detection performance and reducing the false alarm probability.

Meanwhile, the method according to the exemplary embodiment of the present disclosure as described above may be prepared by a computer program. Codes and code segments configuring the computer program may be easily deduced by computer programmers in the art. In addition, the prepared program is stored in computer readable recording media (information storage media) and is read and executed by a computer, thereby implementing the methods according to the present disclosure. Further, the recording media may include any type of recording media which may be read by a computer.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A spectrum sensing method, comprising:
    (a) sampling a received signal:
    (b) calculating a first operation value relating to a strength of the received signal based on the sampled signal;
    (c) searching for a first frequency band having the largest correlation with an input signal based on the sampled signal;
    (d) calculating a first residual component signal by removing a signal component in the first frequency band from the received signal;
    (e) calculating a second operation value relating to a strength of the first residual component signal; and
    (f) determining whether the frequency band occupied in the received signal is present based on a relative value of the first operation value and the second operation value.

2. The spectrum sensing method of claim 1, wherein in the step (f), when a ratio of the first operation value to the second operation value exceeds a reference value, it is determined that the frequency band occupied in the first residual component signal remains.

3. The spectrum sensing method of claim 1, further comprising:
    searching for a second frequency band having the largest correlation in the first residual component signal;
    calculating a second residual component signal by removing a signal component in the second frequency band from the first residual component signal; and
    calculating a third operation value relating to a strength of the second residual component signal,
    wherein in the step (f), it is determined whether the frequency band occupied in the sampled signal remains by comparing a first difference value which is a difference between the first operation value and the second operation value with a second difference value which is a difference between the second operation value and the third operation value.

4. The spectrum sensing method of claim 1, wherein the step (f) includes:
    calculating the difference between the first operation value and the second operation value;
    normalizing the difference value; and
    when the normalized value is equal to or more than the reference value, determining whether the frequency band occupied in the first residual component signal remains.

5. The spectrum sensing method of claim 1, wherein if it is determined in the step (f) that the occupied frequency band remains,
    the steps (b) to (f) are repeatedly performed using the first residual component signal calculated in the step (d) as an input, instead of the signal sampled in the step (b).

6. The spectrum sensing method of claim 1, wherein the sampling uses a compressive spectrum sensing method.

7. The spectrum sensing method of claim 1, wherein the first operation value and the second operation value are a F-norm value of a matrix representing a signal.

8. A spectrum sampling device, comprising:
    a sampling unit configured to sample a received signal;
    a first operation unit configured to calculate an operation value relating to a strength of an input signal;
    a frequency searching unit configured to search for a frequency band having the largest correlation with the input signal;
    a second operation unit configured to generate a residual component signal by removing a signal component in a specific frequency band from the input signal; and
    a determination unit configured to determine whether the occupied frequency band is present,
    wherein the first operation unit receives the signal sampled by the sampling unit and the residual component signal generated from the second operation unit, respectively, as the input signal to calculate a first operation value and a second operation value which are operation values for each signal,
    the frequency searching unit receives the signal sampled by the sampling unit or the residual component signal generated from the second operation unit as the input signal to search for the frequency band having the largest correlation for the received signal, and
    the determination unit determines whether the frequency band occupied in the received signal is present based on a relative value of the first operation value and the second operation value.

9. The spectrum sensing device of claim 8, wherein the determination unit determines that the frequency band occupied in the first residual component signal remains when a ratio of the second operation value to the first operation value is equal to or more than a reference value.

10. The spectrum sensing device of claim 8, wherein the frequency searching unit searches for a first frequency band from the sampled signal and searches for a second frequency band from the residual component signal generated from the second operation unit,
    the second operation unit calculates a first residual component signal by removing a signal component in the first frequency band from the sampled signal and calculates a second residual component signal by removing a signal component in the second frequency band from the first residual component signal, and the first operation unit additionally calculates a third operation value from the second residual component signal, and the determination unit determines whether the frequency band occupied in the sampled signal remains by comparing a first difference value which is a difference between the first operation value and the second operation value with a second difference value which is a difference between the second operation value and the third operation value.

11. The spectrum sensing device of claim 8, wherein the determination unit calculates a difference between the first operation value and the second operation value and normalizes the calculated difference value to determine whether the frequency band occupied in a signal currently input to the second operation unit remains when the normalized value is equal to or more than the reference value.

12. The spectrum sensing device of claim 8, wherein when the determination unit determines that the frequency band occupied in the signal currently input to the second operation unit remains, operations of each of the frequency searching unit, the first operation unit, and the determination unit are repeated based on the residual component signal generated from the second calculation unit.

13. The spectrum sensing device of claim 8, wherein the sampling unit uses a compressive spectrum sensing method.

14. The spectrum sensing device of claim 8, wherein the first operation value and the second operation value are a F-norm value of a matrix representing a signal.

15. A compressive spectrum sensing method, comprising:
detecting a first signal component derived from an input signal and a second signal component obtained by removing the strongest signal component in a frequency band in the first signal component from the first signal component;
calculating a first operation value and a second operation value relating to sizes of each of the first signal component and the second signal component; and
determining whether the frequency band occupied in the input signal is present based on a relative value of the first operation value and the second operation value.

* * * * *